United States Patent
Parks et al.

(10) Patent No.: US 8,991,166 B2
(45) Date of Patent: Mar. 31, 2015

(54) TORQUE CONVERTER DRIVE CONNECTION

(75) Inventors: Kevin L. Parks, Wooster, OH (US); Michael Davis, Sterling, OH (US); Scott Strong, Wooster, OH (US); Philip George, Wooster, OH (US)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 692 days.

(21) Appl. No.: 13/309,499

(22) Filed: Dec. 1, 2011

(65) Prior Publication Data

US 2012/0137669 A1 Jun. 7, 2012

Related U.S. Application Data

(60) Provisional application No. 61/418,742, filed on Dec. 1, 2010.

(51) Int. Cl.
  *F16D 33/00* (2006.01)
  *F16H 41/24* (2006.01)
  *F16D 1/076* (2006.01)
(52) U.S. Cl.
  CPC ............ *F16D 1/076* (2013.01); *F16D 2300/08* (2013.01)

USPC ........................................ 60/330; 416/197 C
(58) Field of Classification Search
  CPC ....................................................... F16H 41/24
  USPC ............ 60/330–367; 416/197 C, 197 R, 180; 415/214.1, 215.1
  See application file for complete search history.

(56) References Cited

U.S. PATENT DOCUMENTS

| 3,829,864 A * | 8/1974 | Truskanov et al. ........... 343/833 |
| 6,830,140 B2 | 12/2004 | Zink et al. |
| 2004/0112047 A1 * | 6/2004 | Vogelsang et al. .............. 60/330 |

* cited by examiner

*Primary Examiner* — Edward Look
*Assistant Examiner* — Daniel Collins
(74) *Attorney, Agent, or Firm* — Kathryn A. Warner; Kevin L. Parks

(57) ABSTRACT

A drive connection for fixing a torque converter to an engine crankshaft includes a crankshaft, a torque converter, and a threaded fastener. The crankshaft includes an end face, a rotational axis, and a threaded hole aligned with the axis. The torque converter includes a rotational axis and a cover having an aperture aligned with the axis. The threaded fastener extends through the aperture and is engaged with the threaded hole to secure the cover to the end face. In an example embodiment, the drive connection includes a sealing element disposed between the fastener and the cover. The sealing element may be a washer or an o-ring.

17 Claims, 3 Drawing Sheets

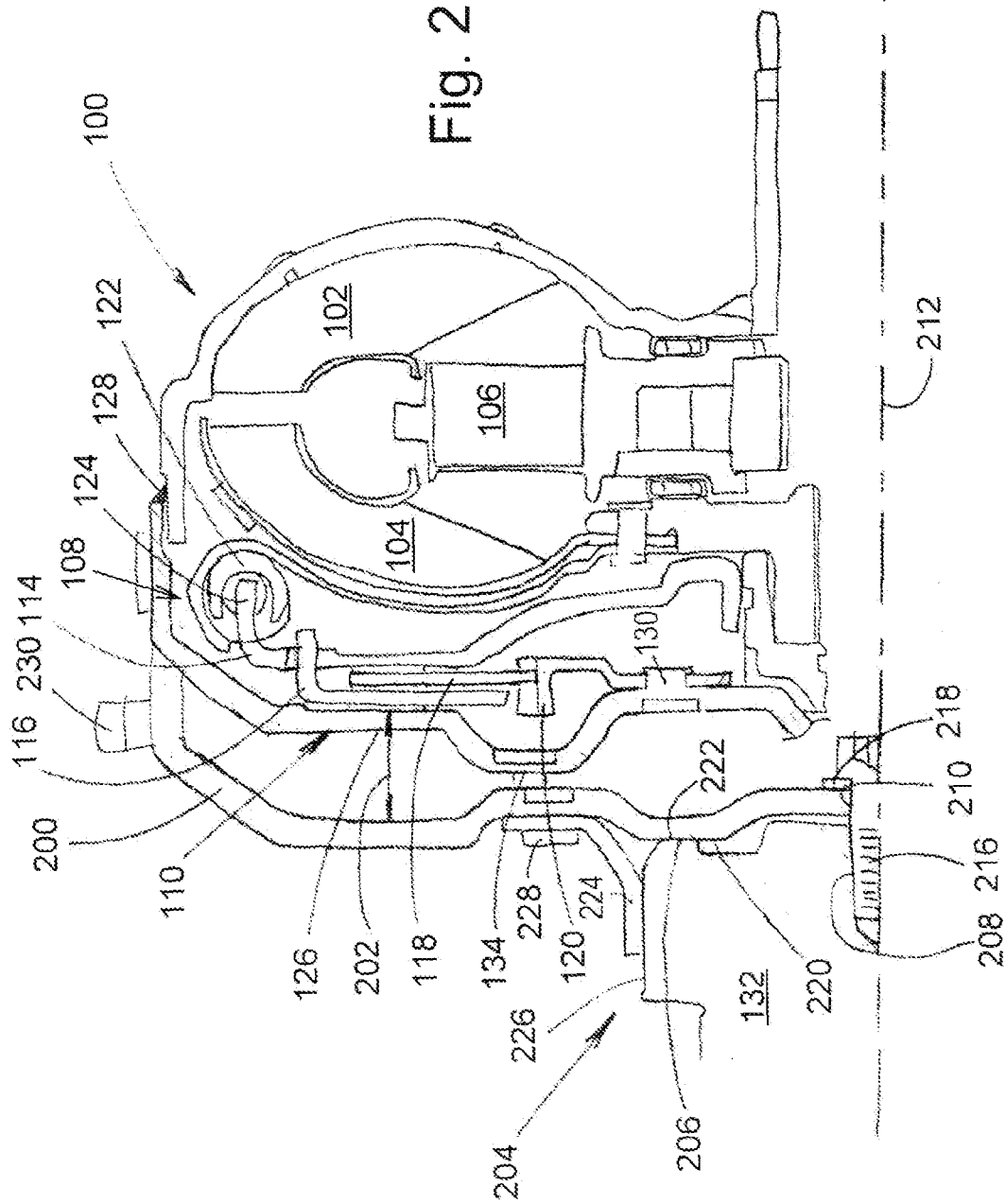

TORQUE CONVERTER DRIVE CONNECTION

FIELD

The invention relates generally to a torque converter, and more specifically to a drive connection of a torque converter engaged with a crankshaft of a vehicle engine.

BACKGROUND

It is known to attach a torque converter to an engine crankshaft through a flexplate. Typical flexplates are bolted to the crankshaft near an inner diameter of the flexplate, and attached to the torque converter near an outer diameter of the flexplate. Flexplates may be attached to a drive plate fixed to a torque converter cover by extruded rivets, for example, or to studs or lugs fixed directly to the torque converter shell by welding, for example. Flexplates, drive plates, studs, and lugs consume valuable space in a bellhousing of the engine, restricting the allowable space for the torque converter.

The flexplate-to-cover connection is generally made during assembly of the engine, while the flexplate-to-converter connection is generally made when the engine is mated to the transmission. Because of limited accessibility, each flexplate-to-converter connection is made individually through an access area at the bottom of the bellhousing. The flexplate must be rotated to gain access to the various fasteners, thereby increasing assembly time.

BRIEF SUMMARY

Example aspects broadly comprise a drive connection for fixing a torque converter to an engine crankshaft including a crankshaft, a torque converter, and a threaded fastener. The crankshaft includes an end face, a rotational axis, and a threaded hole aligned with the axis. The torque converter includes a rotational axis and a cover having an aperture aligned with the axis. The threaded fastener extends through the aperture and is engaged with the threaded hole to secure the cover to the end face. In an example embodiment, the drive connection includes a sealing element disposed between the fastener and the cover. The sealing element may be a washer or an o-ring.

In an example embodiment, the crankshaft includes an outer diameter and the cover includes a centering plate for radially positioning the cover relative to the outer diameter. In an example embodiment, the cover includes a radial wall and the end face includes an axial protrusion frictionally engaged with the radial wall. In an example embodiment, the end face and the cover each comprise complementary face splines, and the face splines are axially engaged.

In some example embodiments, the crankshaft includes an aperture and the cover includes an axial protrusion radially offset from the rotational axis and disposed in the aperture. In an example embodiment, the crankshaft aperture or the cover axial protrusion is tapered. In some example embodiments, the drive connection includes a sealing element, the crankshaft or the cover includes a recessed area, and the sealing element is compressed by the other of the crankshaft or the cover into the recessed area. In an example embodiment, the crankshaft includes a circumferential face, the cover includes a circumferential face axially aligned with the crankshaft circumferential face, and the recessed area is disposed on the crankshaft circumferential face or the cover circumferential face.

In an example embodiment, the drive connection includes a drive adapter with an axial protrusion and a face spline. The crankshaft includes an aperture, the cover includes a face spline, the drive adapter axial protrusion is disposed in the crankshaft aperture, and the drive adapter face spline is engaged with the cover face spline.

Other example aspects broadly comprise a bolted torque converter connection including a torque converter cover with a rotational axis and an aperture aligned with the axis. The cover is arranged for fixing directly to an engine crankshaft by a fastener disposed in the aperture. In some example embodiments, the torque converter includes a radial wall for engaging the crankshaft. In an example embodiment, the radial wall includes a face spline or an axial protrusion. In an example embodiment, the fastener is sealed to the cover by a washer or an o-ring.

Other example aspects broadly comprise a method of installing a torque converter between an engine and transmission including providing a torque converter cover including a rotational axis and a hole aligned with the cover rotational axis; providing an engine crankshaft including a rotational axis and a threaded hole aligned with the crankshaft rotational axis; and installing a fastener through the cover hole into the threaded hole. The method also includes installing a transmission shaft into the torque converter and fixing the transmission to the engine. In an example embodiment, the method includes sealing the fastener to the cover with a washer or o-ring. In an example embodiment, the method includes installing the fastener in the hole during assembly of the torque converter and welding an impeller to the cover to retain the fastener in the converter. In an example embodiment, the method includes radially positioning the cover relative to the crankshaft by a centering plate, a face spline, or an axial protrusion extending from the cover.

BRIEF DESCRIPTION OF THE DRAWINGS

The nature and mode of operation of the present invention will now be more fully described in the following detailed description of the invention taken with the accompanying drawing figures, in which:

FIG. 2 is a top-half cross-section view comparing torque converter drive connections;

DETAILED DESCRIPTION

At the outset, it should be appreciated that like drawing numbers appearing in different drawing views identify identical, or functionally similar, structural elements. Further-more, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
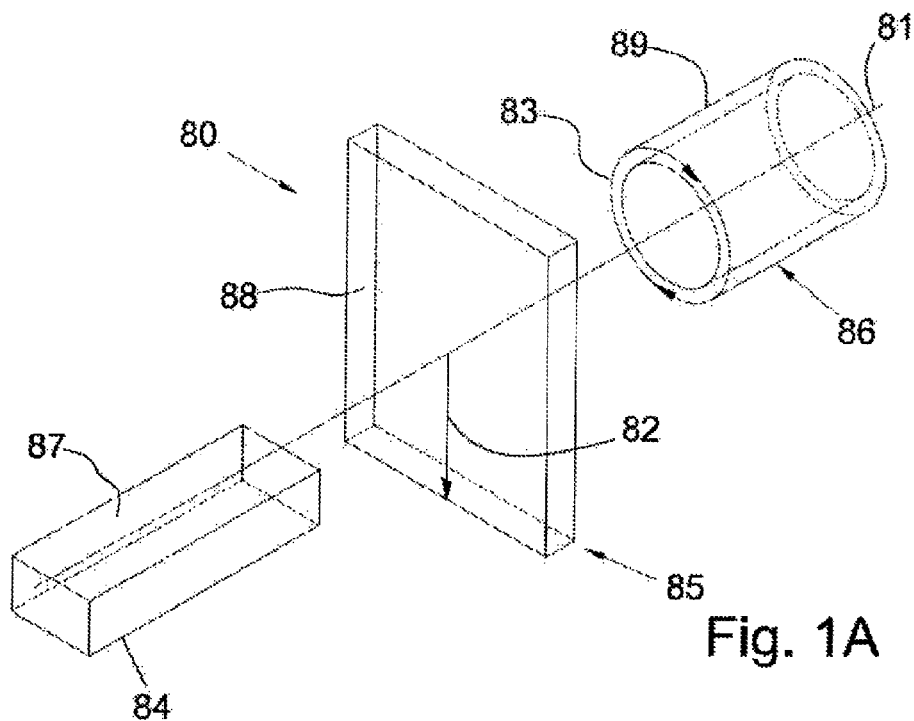
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
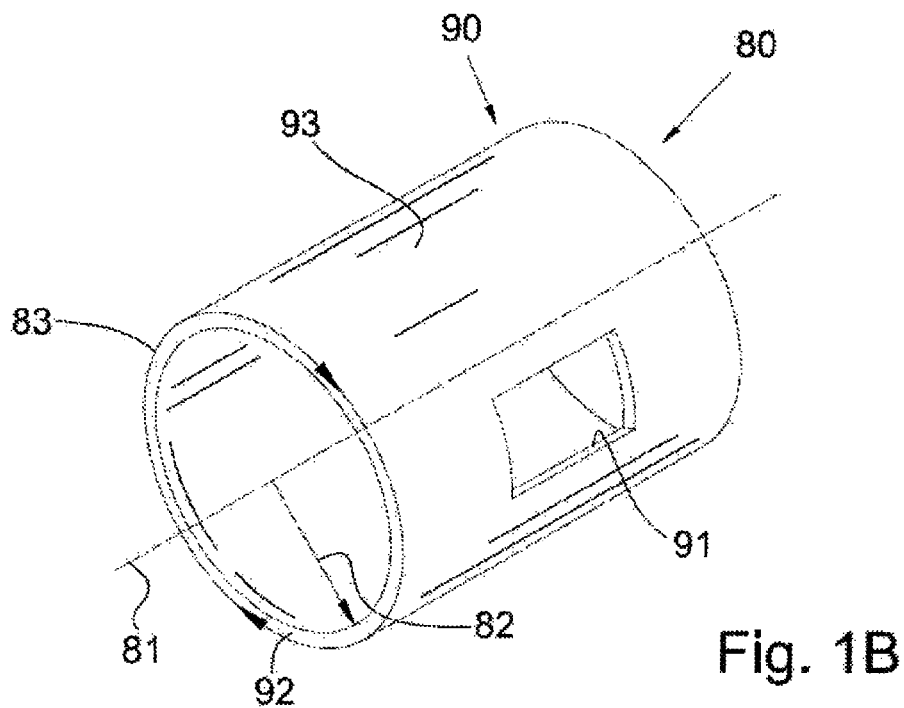
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

The following description is made with reference to FIG. 2. FIG. 2 is a top-half cross-section view comparing torque converter drive connections. Torque converter 100 includes impeller 102, turbine 104, stator 106, and damper 108. Clutch 110 includes piston 114, piston drive plate 116, cover drive plate 118, and drive hub 120. Damper spring 122 is engaged with clutch 110 through axial protrusion 124 of piston 114.

Cover 126 is fixed to impeller 102 at weld 128. Hub 120 is fixed to cover 126 by at least one extruded rivet 130. In known designs, crankshaft 132 is attached to a flexplate (not shown) by fasteners (not shown). In the case of cover 126, the flexplate is attached to the cover through a drive plate (not shown) attached at extruded rivets 134. Other cover designs (not shown) may include lugs or studs fixed to the cover to attach converter 100 to the flexplate. Typically, cover 126 includes a pilot (not shown) disposed in a central bore (not shown) of crankshaft 132 for radially positioning converter 100.

Cover 200 is shown next to cover 126 to emphasize space gained by fixing cover 200 directly to crankshaft 132 without a flexplate or drive plate. For example, distance 202 between cover 200 and cover 126 could be used to reduce the installed length of converter 100 or to increase the size of clutch 110 and/or damper spring 122 for increased performance.

Cover 200 is attached to crankshaft 132 through drive connection 204. Connection 204 includes end face 206 and threaded hole 208 for crankshaft 132. Connection 204 further includes cover 200 with aperture, or hole, 210 extending along central axis, or rotational axis, 212 of torque converter 214, and threaded fastener, or bolt, 216 extending through aperture 210 and engaging threaded hole 208 to secure cover 200 to end face 206. That is, converter 100 is assembled to crankshaft 132 by tightening threaded fastener 216 to secure cover radial wall 220 against end face axial protrusion 222 to transmit torque from crankshaft 132 to torque converter 100 by friction. Fastener 216 may be tightened by engaging an internal surface, such as an Allen-head bolt, or an external surface, such as a hex head cap screw, although other fasteners are possible. Friction can be increased, if necessary, by further tightening bolt 216 to increase clamping force between protrusion 222 and wall 220.

Connection 204 includes sealing element 218 disposed between fastener 216 and cover 200 creating a fluid-tight seal between the cover and the fastener. Sealing element 218 may be a sealing washer made from a ductile material such as copper or aluminum, for example, as shown in FIG. 2. Other sealing elements are possible. For example, sealing element 218 may be an o-ring as described below.

Connection 204 may also include centering plate 224 for radially positioning cover 200 relative to outer diameter 226 of crankshaft 132. Plate 224 is fixed to cover 200 by extruded rivet 228. Ring gear 230 for engagement with a starter motor (not shown) to start the engine is typically attached to the flexplate (not shown) in known designs, but may be fixed to cover 200 as shown in FIG. 2.

Figure 3:
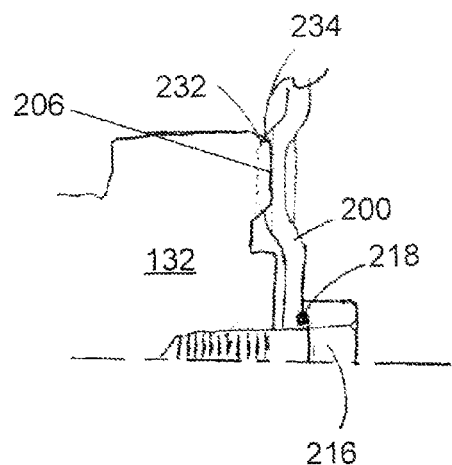
FIG. 3 is a detail view of an alternative embodiment of the torque converter drive connection of FIG. 2 including a face spline connection.

The following description is made with reference to FIG. 3. FIG. 3 is a detail view of an alternative embodiment of torque converter drive connection 204 of FIG. 2 including a face spline connection. End face 206 may include face spline 232 and cover 200 may include complementary face spline 234. Splines 232 and 234 may be similar to complementary splines described in commonly-assigned U.S. Pat. No. 7,597,405 for "Wheel Bearing Joint Unit", hereby incorporated by reference.

Splines 232 and 234 are axially engaged for transmitting torque crankshaft 132 to torque converter 100. That is, when bolt 216 is tightened, splines 232 and 234 are tightly engaged to create a torque transmitting connection. It should be noted that engagement of splines 232 and 234 may also perform the centering function of plate 224 in FIG. 2. Bolt 216 includes o-ring sealing element 218, creating a fluid-tight seal between bolt 216 and cover 200 when bolt 216 is tightened.

Figure 4:
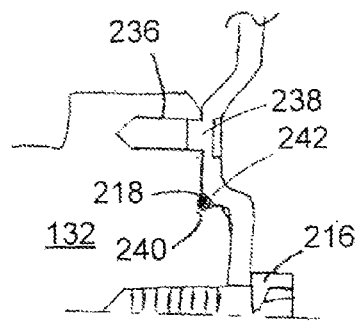
FIG. 4 is a detail view of an alternative embodiment of the torque converter drive connection of FIG. 2 including an axial protrusion.

The following description is made with reference to FIG. 4. FIG. 4 is a detail view of an alternative embodiment of the torque converter drive connection of FIG. 2 including an axial protrusion. In the embodiment shown in FIG. 4, crankshaft 132 includes aperture 236 and cover 200 includes axial protrusion 238 disposed in cover aperture 236 for transmitting torque from crankshaft 132 to torque converter 100. In an example embodiment (not shown), crankshaft aperture 236 or cover axial protrusion 238 is tapered so that additional tightening of bolt 216 wedges the protrusion into the aperture. By tapering the aperture and/or the protrusion, tightening bolt 216 eliminates lash required to assemble the components. If lash is present between the protrusion and the aperture of connection 204, repeated impacts resulting from engine firings may lead to damage or destruction of connection 204.

Crankshaft 132 includes recessed area 240 for receiving sealing element 218. Sealing element 218 is compressed in recessed area 240 when fastener 216 is tightened, creating a fluid-tight seal between cover 200 and crankshaft 132. Although recessed area 240 is shown in crankshaft 132, area 240 may be disposed in cover 200 as chamfer 242, or may be present in both components.

Figure 5:
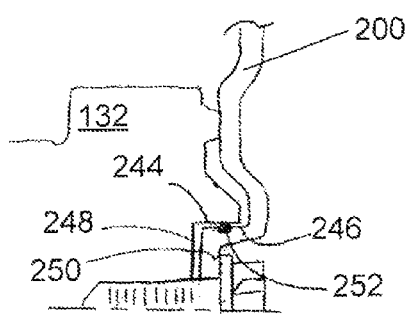
FIG. 5 is a detail view of an alternative embodiment of the torque converter drive connection of FIG. 2 including circumferential sealing faces; and, FIG. 6 is a detail view of an alternative embodiment of the torque converter drive connection of FIG. 2 including a drive adapter.

The following description is made with reference to FIG. 5. FIG. 5 is a detail view of an alternative embodiment of the torque converter drive connection of FIG. 2 including circumferential sealing faces. Crankshaft 132 includes circumferential face 244 and cover 200 includes circumferential face 246 axially aligned with crankshaft face 244. Otherwise stated, crankshaft 132 includes bore 248 and cover 200 includes axially extending portion 250 disposed in the bore. Recessed area 252 is disposed on cover circumferential face 246. In another embodiment (not shown), recessed area 252 is disposed on crankshaft face 244. Engagement of seal 218 with faces 244 and 246 creates a fluid-tight seal between cover 200 and crankshaft 132.

Figure 6:
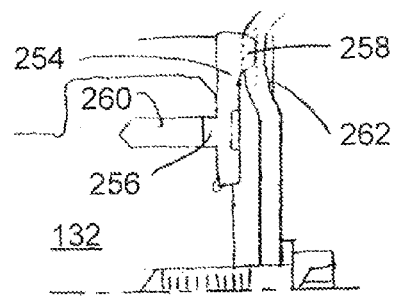

The following description is made with reference to FIG. 6. FIG. 6 is a detail view of an alternative embodiment of the torque converter drive connection of FIG. 2 including a drive adapter. Drive connection 204 may include drive adapter 254 including axial protrusion 256 and a face spline 258. Crankshaft 132 includes aperture 260 and cover 200 includes face spline 234, as described above. Drive adapter axial protrusion 256 is disposed in crankshaft aperture 260, and drive adapter face spline 258 is engaged with cover face spline 262 for transmitting torque from crankshaft 132 to torque converter 100 through drive adapter 254. Adapter 254 may be useful to adapt an existing crankshaft design (i.e., including existing fastener holes for attaching a flexplate to the crankshaft) to a new drive connection without a flexplate.

The following description is made with reference to FIGS. 2-6. An example embodiment includes a method of installing a torque converter between an engine and transmission. The method may include providing a cover with a rotational axis and a hole aligned with the cover rotational axis; providing an engine crankshaft with a rotational axis and a threaded hole aligned with crankshaft rotational axis; installing a fastener through the cover hole into the threaded hole; installing a transmission shaft into the torque converter; and, fixing the transmission to the engine. The method may include sealing the fastener to the cover with a washer or o-ring. The method may include installing the fastener in the hole during assembly of the torque converter and welding an impeller to the cover to retain the fastener in the converter. The method may include radially positioning the cover relative to the crankshaft by a centering plate, a face spline, or an axial protrusion extending from the cover.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A drive connection for fixing a torque converter to an engine crankshaft comprising:
   a crankshaft including:
   an end face;
   a rotational axis; and,
   a threaded hole aligned with the axis;
   a torque converter including:
   a rotational axis; and,
   a cover having an aperture aligned with the axis;
   a threaded fastener extending through the aperture and engaged with the threaded hole to secure the cover to the end face; and,
   a sealing element disposed between the fastener and the cover.

2. The drive connection of claim 1, wherein the sealing element is a washer.

3. The drive connection of claim 1, wherein the sealing element is an o-ring.

4. The drive connection of claim 1, wherein:
   the crankshaft includes an outer diameter; and,
   the cover includes a centering plate for radially positioning the cover relative to the outer diameter.

5. The drive connection of claim 1, wherein:
   the cover includes a radial wall, and,
   the end face includes an axial protrusion frictionally engaged with the radial wall.

6. The drive connection of claim 1, wherein the end face and the cover each comprise complementary face splines, and the face splines are axially engaged.

7. The drive connection of claim 1, wherein:
   the crankshaft comprises an aperture; and,
   the cover comprises an axial protrusion radially offset from the rotational axis and disposed in the aperture.

8. The drive connection of claim 7, wherein the crankshaft aperture or the cover axial protrusion is tapered.

9. The drive connection of claim 1, wherein:
   the crankshaft or the cover includes a recessed area; and,
   the sealing element is compressed by the other of the crankshaft or the cover into the recessed area.

10. The drive connection of claim 9, wherein:
    the crankshaft includes a circumferential face;
    the cover includes a circumferential face axially aligned with the crankshaft circumferential face; and,
    the recessed area is disposed on the crankshaft circumferential face or the cover circumferential face.

11. The drive connection of claim 1, further comprising:
    a drive adapter including:
    an axial protrusion; and,
    a face spline, wherein:
    the crankshaft includes an aperture;
    the cover includes a face spline;
    the drive adapter axial protrusion is disposed in the crankshaft aperture; and,
    the drive adapter face spline is engaged with the cover face spline.

12. A bolted torque converter connection comprising:
    a torque converter cover with a rotational axis and an aperture aligned with the axis, the cover being arranged for fixing directly to an engine crankshaft by a fastener disposed in the aperture, wherein the fastener is sealed to the cover by a washer or an o-ring.

13. The bolted torque converter connection of claim 12 wherein the torque converter includes a radial wall for engaging the crankshaft.

14. The bolted torque converter connection of claim 13 wherein the radial wall includes a face spline or an axial protrusion.

15. A method of installing a torque converter between an engine and transmission comprising:
    providing a torque converter cover including a rotational axis and a hole aligned with the cover rotational axis;

providing an engine crankshaft including a rotational axis and a threaded hole aligned with the crankshaft rotational axis;
installing a fastener through the cover hole into the threaded hole;
installing a transmission shaft into the torque converter; and,
sealing the fastener to the cover with a washer or o-ring.

16. The method of claim 15 further comprising:
installing the fastener in the hole during assembly of the torque converter; and,
welding an impeller to the cover to retain the fastener in the converter.

17. The method of claim 15 further comprising:
radially positioning the cover relative to the crankshaft by a centering plate, a face spline, or an axial protrusion extending from the cover.

* * * * *